(12) United States Patent
Ricci et al.

(10) Patent No.: US 6,463,039 B1
(45) Date of Patent: Oct. 8, 2002

(54) METHOD AND APPARATUS FOR FULL DUPLEX SIDEBAND COMMUNICATION

(75) Inventors: Christopher P. Ricci, Pembroke, MA (US); William Peters, Kingston, NH (US)

(73) Assignee: Intelligent Ideation, Inc., Amesbury, MA (US)

(*) Notice: Subject to any disclaimer, the term of this patent is extended or adjusted under 35 U.S.C. 154(b) by 0 days.

(21) Appl. No.: 09/065,838

(22) Filed: Apr. 24, 1998

(51) Int. Cl.[7] ............... H04B 7/00; H04B 1/68; H04Q 5/22
(52) U.S. Cl. ............... 370/277; 340/10.3; 340/10.4; 455/42; 455/46; 455/47
(58) Field of Search ............... 370/276–277, 370/310; 375/219–221, 270, 301, 321; 455/42, 45–47; 340/10.1, 10.3, 10.34, 10.4, 10.41, 572.1, 572.2, 572.4, 572.5; 342/42, 44, 51, 410–414, 116

(56) References Cited

U.S. PATENT DOCUMENTS

| | | | | |
|---|---|---|---|---|
| 5,317,309 A | * | 5/1994 | Vercellotti et al. | 340/10.34 |
| 5,543,798 A | * | 8/1996 | Schuermann | 342/42 |
| 5,977,913 A | * | 11/1999 | Christ | 342/465 |
| 6,064,320 A | * | 5/2000 | d'Hont et al. | 342/42 |

* cited by examiner

Primary Examiner—Wellington Chin
Assistant Examiner—Maikhanh Tran
(74) Attorney, Agent, or Firm—Chris Ricci

(57) ABSTRACT

The invention is an apparatus and method for using electromagnetic energy as the means of automatic data collection (ADC). The communication system that comprises the invention utilizes frequency modulated ("FM") sideband electromagnetic energy to enable full duplex communication with another communication device. In one embodiment one of the communication devices is passive and the carrier is used to power the passive device. In another embodiment the communication devices are active and the carrier is suppressed to increase range or decrease power constraints, as the application requires.

18 Claims, 4 Drawing Sheets

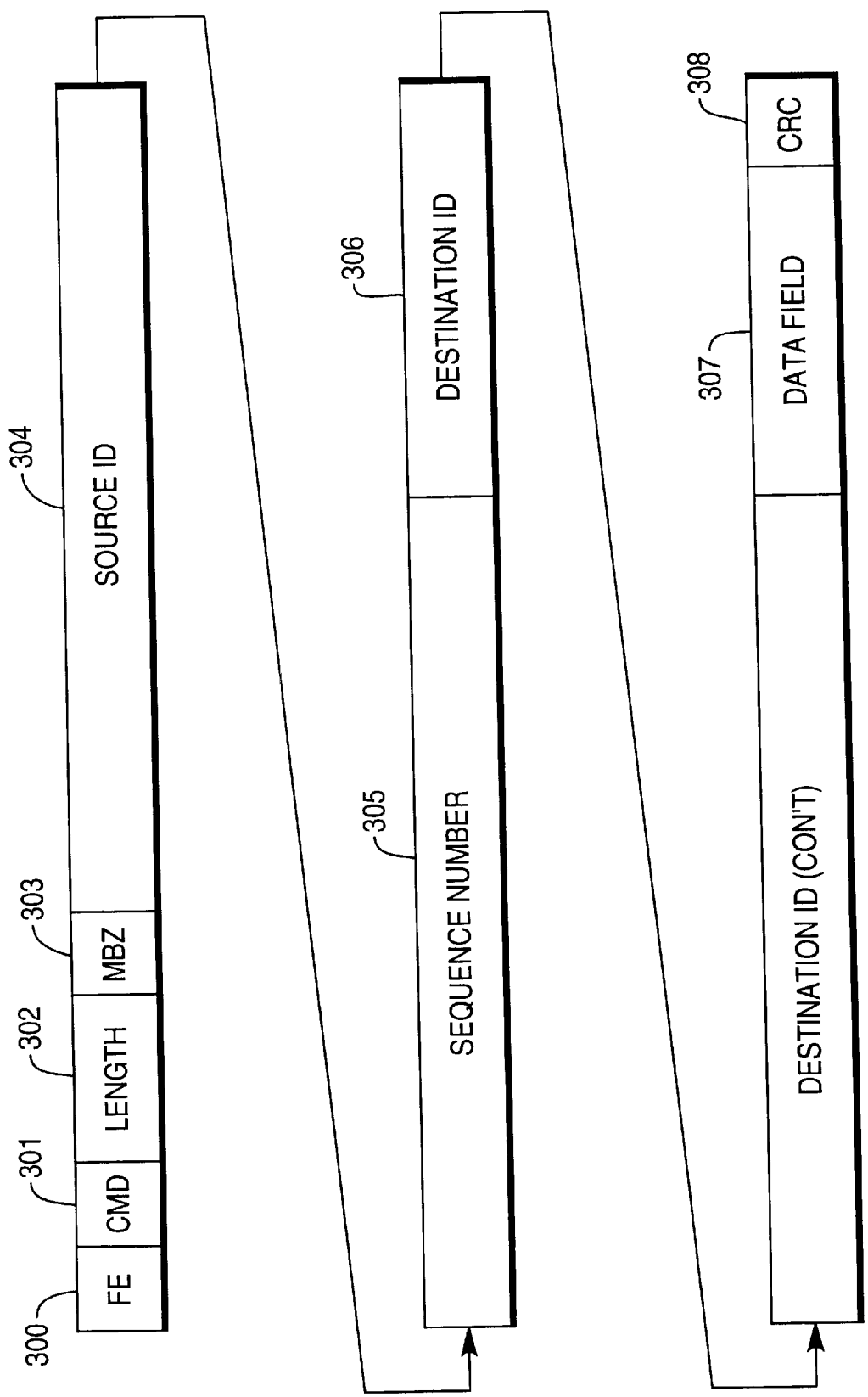

METHOD AND APPARATUS FOR FULL DUPLEX SIDEBAND COMMUNICATION

BACKGROUND OF THE INVENTION

The present invention relates generally to an apparatus and method for using electromagnetic energy as the means of automatic data collection (ADC). More particularly, the invention relates to an apparatus and method for using frequency modulated ("FM") sideband electromagnetic energy to enable full duplex communication with another communication device.

Radio frequency ("RF") remains the sole medium for conducting wireless communication. Despite the efforts of those in the fiber-optics industry to portray light as a wireless medium, it is still a materially bound, point-to-point connection that requires the use of cable.

In the RF domain, communication devices are further subdivided by their power source. The subdivision is generally based upon whether the communication device is "active" or "passive." An active communication device requires an external power source such as direct current ("DC") from a battery or alternating current ("AC") from a power grid, for example. In contrast, a passive device draws its power from ambient energy such as solar, wind, or ambient RF, for example.

Active devices have the most versatility due to their general lack of power constraints. However, in many applications an external power source is not practical. For example, in a vehicle navigation application where transponders are placed along a roadside, an AC connection to each transponder is cost prohibitive and a DC source causes severe maintenance problems.

Some of the many commercially active areas that are currently using passive wireless communications are Radio Frequency Identification ("RFID"), microcellular, and networking, for example.

RFID uses radio frequency transmission to identify, categorize, locate, and/or track people, animals, and objects. An RFID system is commonly composed of three components: an interrogator (reader), a transponder (tag), and a data processing system such as a computer.

The simplest form of RFID products can be compared to an electronic bar code. They operate by the interrogator transmitting a RF wave to the transponder. The transponder then absorbs the RF energy from the interrogator to change an internal power tank circuit. Sufficient energy is stored, the transponder transmits its stored code on a known frequency to be received by the interrogator. The data processing system then interprets the code.

More sophisticated RFID products interface with external sensors for measuring various parameters, including Global Positioning Systems ("GPS") which track objects. In these systems, the code transmitted by the transponder is variable.

One limitation to currently available RFID systems is that the interrogator and transponder communicate in an atomic sequence, i.e., one transponder at a time. The interrogator's RF field must be constrained to the general area expected to be occupied by the desired transponder. If two transponders are present, the read operation will fail.

In addition current RFID systems have the limitation that only one interrogator may acquire a transponder at any time. RF fields from closely adjacent interrogators will interfere with each others operation.

Further, even low levels of RF energy are very leaky and propagate into unexpected areas by unexpected means, commonly referred to as electromagnetic interference ("EMI"). Since the radio frequency spectrum is shared and busy, the interrogator/transponder communication channel is susceptible to disruption from random sources of RF. Therefore, current RFID technology relies on close proximity of the interrogator/transponder pair and exceedingly low power levels of operation to limit EMI. This has limited the art to a range of approximately one and one half meters maximum.

Sophisticated systems generally require an active system to support the required peripherals. Further, when used for tracking and locating, RFID remains expensive due to the extensive support peripherals required, such as GPS.

In microcellular applications, the current direction being explored is to use the harmonic generation and optoelectronic mixing properties of Mach-Zenhnder modulators to generate modulated subcarrier signals at high-order harmonics of the input signals. This permits the simultaneous transmission over optical fiber of a modulated and an unmodulated signal, both at high-order harmonic frequencies of the input signals, for the purpose of transmitting both a local oscillator tone and the modulated signal required at a base station for microcellular applications, see IEEE Transactions on Microwave Theory and Techniques, March 1996 v44 n3 p446(8).

Though this technique solves the problem of simultaneous communication of the modulated and unmodulated signals, it does so by constraining the transmission medium. Thus, this technique can not be applied to RF and even assuming that it could, it would require active devices on both ends.

In one commercially available system provided by RadioLAN, Inc., a RF networking card is used in a laptop computer to link the laptop to a local-area network ("LAN"). The transmission rate can be at 10 Mbps Ethernet speeds, but its use of proprietary protocols and non-standard narrowband frequency makes it useless in multi-vendor installations.

One approach that has been taken in the wireless industry has been the use of single-sideband transmission. In these systems, single-sideband is simply a sophisticated form of amplitude modulation. When RF and audio frequency ("AF") signals are combined in a standard amplitude modulation ("AM") transmitter (such as one used for commercial broadcasting) four output signals are generated: the original RF signal, called the carrier; the original AF signal; and two sidebands, whose frequencies are the sum and difference of the original RF and AF signals, and whose amplitudes are proportional to that of the original AF signal.

The sum component is called the upper sideband. The upper sideband is erect, in that increasing the frequency of the modulating audio signal causes a corresponding increase in the frequency of the RF output signal.

The difference component is called the lower sideband, and is inverted, meaning an increase in the modulating frequency results in a decrease in the output frequency.

All of the intelligence is contained in the sidebands, but two-thirds of the RF power is in the carrier. The carrier serves only to demodulate the signal in the receiver. If this carrier is suppressed in the transmitter and reinserted in the proper phase in the receiver, several significant communications advantages accrue. If the reinserted carrier is strong compared to the incoming double-sideband signal, exalted carrier reception is achieved in which distortion caused by frequency-selective fading is greatly reduced. Also, the lack of a transmitted carrier eliminates the heterodyne interference common to adjacent AM signals. Perhaps the most important advantage of eliminating the carrier is that the overall efficiency of the transmitter is increased. The power consumed by the carrier can be put to better use in the sidebands.

In normal AM transmission, the power in the carrier is continuous and an AM transmitter requires a heavy-duty power supply. A double sideband transmitter having the same power output as an AM transmitter can use a much lighter power supply because the duty cycle is low. A single-sideband transmitter can, therefore, achieve the same effective range using one third of the output power as a standard AM transmitter.

A problem with AM is that it gives bursts of RF that are not always clear. Further, it is not as easy to detect shifts in an AM signal. This is particularly true with moving targets because amplitudes decrease proportionally to the distance to the transmitter.

Accordingly, it is an object of this invention to provide a wireless communication system that is adaptable to multiple applications.

It is another object of this invention to provide a wireless communication system that is power limited for passive applications.

It is still another object of this invention to provide a wireless communication system that is full duplex and can include unmodulated signals.

It is a further object of this invention to provide a wireless communication system that works in the presence of EMI, multiple transponders and/or interrogators.

It is still another object of the invention to use single-sideband transmission to increase range in passive RF systems but to do so without significantly decreasing the signal-to-noise ratio.

These and other objects of the invention will be obvious and will appear hereinafter.

SUMMARY

The aforementioned and other objects are achieved by the invention which provides a communication system and a method associated therewith. The communication system comprises a transmitter, a transponder, and a receiver.

The communication system described herein blends techniques in use by cellular and networked systems architectures into one. The protocol allows multiple RF targets and interrogators to coexist and function in a shared airspace through error handling and backoff algorithms similar to Ethernet. Thus completing a system for duplex data communications and simplified radio architecture.

The transmitter is adapted to transmit on a predetermined frequency a first sideband and adapted to have first frequency-modulated data encoded thereon.

The transponder then receives the first sideband and transmits on the predetermined frequency a second sideband disposed in a band distinct from the first sideband. The transponder is also adapted to have second frequency-modulated data encoded thereon.

The receiver then receives the second sideband on the predetermined frequency. The second frequency-modulated data is then decodable from the signal to complete the bi-directional communication.

In addition, the concentration of most of the RF power into natural sidebands and the reliability of FM propagation equates into greater operational range and design flexibility.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 7 shows a data packet structure in accordance with the invention; and

DETAILED DESCRIPTION

While the present invention retains utility within a wide variety of communication devices and may be embodied in several different forms, it is advantageously employed in connection with communication devices having strict power limitations. Examples of such devices are passive devices that obtain power from a RF carrier or active devices that operate on batteries or require high bandwidth such that a standard RF channel is not practical. Though these are the forms of the preferred embodiments and will be described as such, these embodiments should be considered illustrative and not restrictive.

Figure 1:
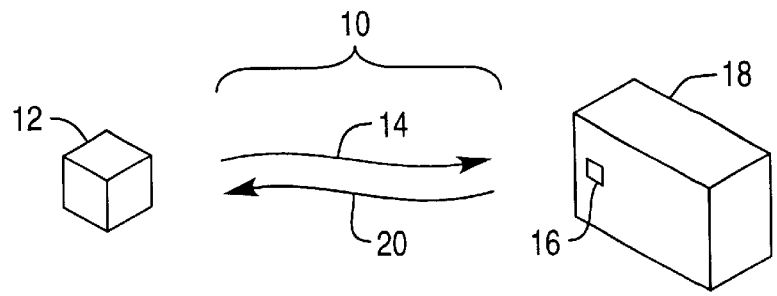
FIG. 1 shows a block diagram of a communication system in accordance with the invention.
Figure 2:
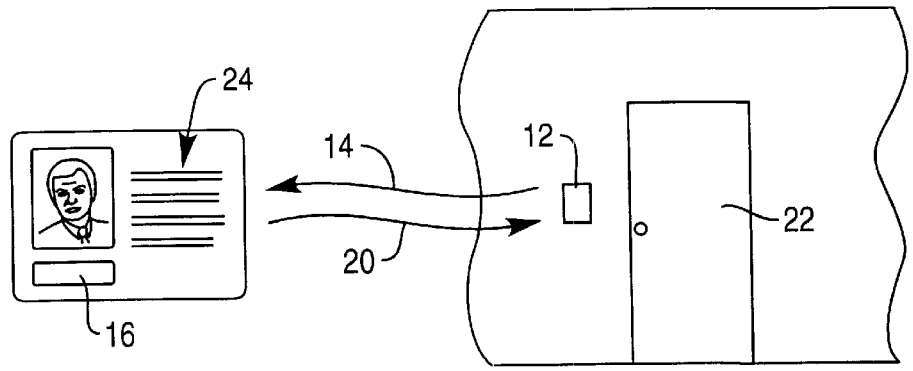
FIG. 2 shows a block diagram of a security system utilizing the communication system according to the invention of FIG. 1.

FIG. 1 shows a communication system 10 wherein an interrogator 12 transmits an interrogator signal 14 to a transponder 16. In this embodiment, the transponder 16 is a passive device disposed on a package 18. The transponder 16 identifies the package 18 thereby providing inventory control.

As is described more particularly in commonly assigned U.S. patent application Ser. No. 08/616,261 entitled "Vehicle Data Acquisition System" filed on Mar. 15, 1996, and incorporated herein by reference, the interrogator signal is used to provide power to the transponder 16. One skilled in the art will realize however, that though the preferred embodiment draws energy from the carrier wave, solar cells, thermopiles, or other devices can be used to power the transponder in the passive embodiment.

The transponder 16 then encodes onto the interrogator signal 14 or copies the interrogator signal 14 and retransmits the copied signal with additional encoding. The transponder 16 encodes a code that provides information relative to the transponder 16. That is, if the transponder 16 is attached to a package 18, as is the case in this embodiment, the code would be indicative of the contents of the package 18.

The encoded signal 20 is then transmitted back to the interrogator 12 where it is decoded.

This embodiment then allows for the reading of transponders located within a predetermined distance of the interrogator 12. Thus, an interrogator can virtually instantaneously take a physical inventory in an entire room or track when and how a certain package was removed from inventory.

In another embodiment of the passive system, the transponder 16 is disposed on an identification card 24. The interrogator 12 in this embodiment is used for security. The interrogator records the entry and exit of personnel through the door by reading the identity of personnel having the identification card 24. The interrogator 12 can also be used to govern the lock on the door 22 so as to restrict access those having authorization.

This embodiment operates in a manner similar to that of the foregoing embodiment. The interrogator 12 transmits an interrogator signal 14 to the transponder 16. In this case the transponder 16 is disposed on the identification card 24 which is worn by or otherwise located on a person. The transponder 16 encodes the interrogator signal 14 and returns an encoded signal 20 to the interrogator 12. The interrogator 12 is loaded or otherwise electronically connected with an electronic database which determines whether that person has permission to enter. In higher security environments, a console may also bring up a photograph of the individual such that a guard can confirm that the holder of the indentification card 24 corresponds to the identification card 24.

In this embodiment, single-sideband communication is used to accomplish the communication given the low power and/or high range requirements of the communication system.

The single-sideband communication used herein uses frequency modulation ("FM"). FM is free of many of the disadvantages of AM and, more particularly, is more resistant to noise and range limitations.

In this embodiment, two types of emissions are used in order to create a full-duplex communication path between the interrogator and the transponder. The interrogator transmits the upper sideband frequency products in the RF carrier frequency as well as the carrier signal itself, i.e., the carrier is not suppressed. Note that in conventional single-sideband operation the carrier is suppressed. However, the carrier in this embodiment is needed to energize the transponder and provide the initial frequency lock. The transponder then only transmits the lower sideband and suppresses its carrier to attain full-duplex communication.

This type of full-duplex communication allows the transponder to share a communication channel simultaneously with the interrogator allowing concurrent operations thereby substantially eliminating communication conflicts at the transponder. This also increases the effective radiated power of the transponder since all of the energy is being pumped into the information carrying frequencies and none is lost to the carrier or upper-sideband frequencies.

With any type of modulation technique and most kinds of encoding techniques the amount of information that can be transmitted on a channel is limited to one-half of its passband value. Whenever two frequencies are mixed, four frequencies result: the original two, the sum, and the difference frequencies. In the preferred embodiment, the passband is 80 kHz wide so the maximum deviation of the carrier frequency is 40 kHz above or below the center frequency, $F_c$.

Figure 3:
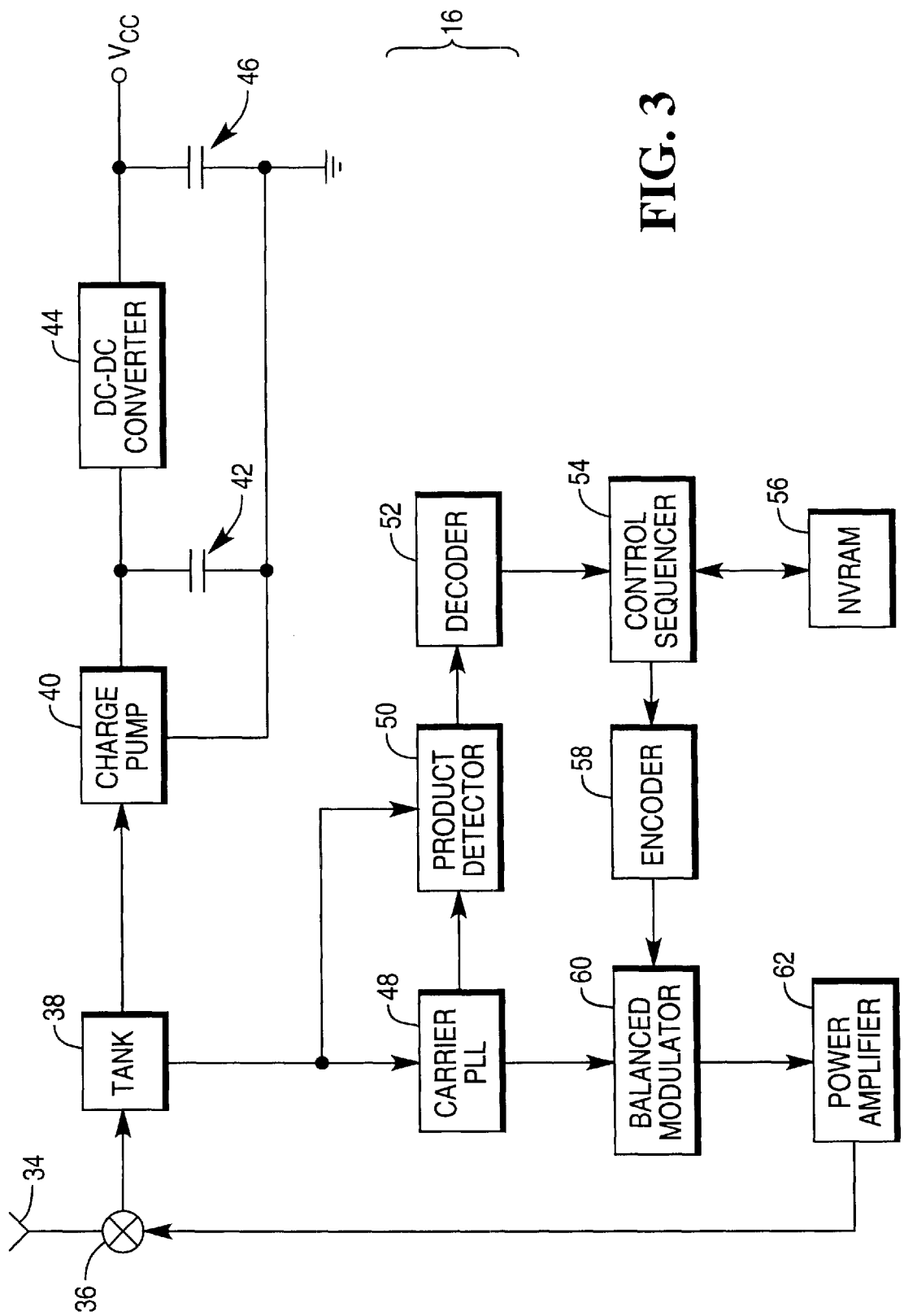
FIG. 3 shows a block diagram of a transponder of the communication system of FIGS. 1 and 2.

Referring now to FIG. 3, there is shown a block diagram illustrative of a transponder 16 of this embodiment. Like one of the previous transponder embodiments, a single antenna 34 is used for both reception and transmission. This can be accomplished substantially simultaneously owing to the single sideband transmission scheme employed where the upper sideband is used in one direction and the lower sideband is used in the other direction, thus providing full-duplex communication.

Additionally, coating can be used to increase signal strength passively. The coating must be such that it absorbs and/or amplifies ambient electromagnetic radiation. One example of such a coating is that manufactured by ARC Technologies, Inc., of Amesbury, Mass. One version of the aforementioned coating is described in U.S. Pat. No. 5,525,988 issued Jun. 11, 1996, entitled "Electromagnetic Radiation Absorbing Shroud." Though originally designed for use in radar avoidance systems such as that used in stealth aircraft, this coating amplifies the incoming signal before passing the signal to the antenna.

Following the path of an incoming signal, the signal is received by the antenna 34 and moved into a tank circuit 38 by a differentiator 36. The differentiator 36 determines whether the signal is incoming or outgoing and routes the signal accordingly.

The tank circuit 38 is a passive tuned circuit designed to harness the power of the carrier signal. In the preferred embodiment, the tank circuit 38 has a center frequency of 924 MHz and a passband of 8 MHz. In one embodiment, the tank circuit 38 is implemented as a part of the antenna circuit 34 and is tuned by the placement and spacing of metal etch thereby eliminating a need for coils or tunable capacitors in the tank circuit 38.

The tank circuit 38 passes the carrier signal on to a charge pump 40. In the preferred embodiment, any signal in the frequency range of 920 to 928 MHz is determined to be a carrier signal for charging purposes.

The charge pump 40 is a voltage rectifier which rectifies the incoming RF signal from the tank circuit 38 and increases the signal voltage up to a useable direct current ("DC") level. In the preferred embodiment, this is a dual diode circuit. The output of the charge pump 40 varies depending on the strength (amplitude) of the RF input. In one sense, the charge pump 40 is an unregulated DC voltage source.

The DC output of the charge pump 40 is passed to a DC-DC converter 44.

The DC-DC converter 44 is a regulation device designed to create a stable output voltage, $V_{CC}$. The output voltage, $V_{CC}$, is the power source for the remaining circuits in the transponder 16. The DC-DC converter 44 is turned on when a threshold voltage is exceeded. In the preferred embodiment, the threshold voltage is 1.4 V and upon receiving this voltage or greater (within the operational range of the DC-DC converter 44), a target voltage of 5.5 V for the output voltage $V_{cc}$ is maintained. The DC operational range for the DC-DC converter 44 in the preferred embodiment is in the range of 1.4 V to 6 V.

An input energy storage device 42 and an output energy storage device 264 are used to store a sufficient amount of surplus energy to enable the transponder 16 to drive the RF power output for a predetermined amount of time. The predetermined amount of time will vary depending upon message length in the system which, in turn, will depend upon the application in which the communication structure is being used. In the preferred embodiment, the energy storage devices 42, 264 are both capacitors and the predetermined amount of time is ten milliseconds.

Once output power $V_{cc}$ is maintained, the remaining circuits are activated. The input signal, both the carrier and the upper sideband, is passed substantially simultaneously to a carrier PLL 48 and a product detector 50.

The carrier PLL 48 has multiple functions. In the preferred embodiment, the carrier PLL 48 amplifies the incoming RF and bends it through a high-speed divider circuit internally. In the preferred embodiment, the high-speed divider circuit first divides the incoming RF by two and then again by three to obtain a frequency in the 154 MHz range suitable for use by high-speed digital logic. In another embodiment, this is accomplished using a local oscillator tuned to produce a difference signal having a frequency of 154 MHz when RF energy of a predetermined frequency is present. One advantage of the preferred embodiment over the latter embodiment is the elimination of traditionally bulky tuned circuits and the local oscillator.

The carrier PLL 48 uses a phase-lock loop ("PLL") to sense the center frequency of the incoming RF signal and lock on that frequency. The carrier PLL 48 provides a clock reference source for any derived frequencies in the transponder 16, including digital clocks if necessary. In the preferred embodiment, the carrier PLL 48 locks on any frequency in the range of 153.33 to 154.66 MHz and a lock is achieved when a minimum of 100 cycles of RF energy is detected.

The product detector 50 is a FM discriminator which translates frequency variation in the received RF signal into a corresponding voltage waveform. The product detector 50 derives amplitude variations in response to frequency variations. In the preferred embodiment, the output of the product detector 50 has a peak voltage of 1.2 volts at the maximum frequency deviation (approximately $F_C+40$ kHz) and a null voltage of 0 V at the center frequency, $F_c$.

The output of the product detector 50 is a positive pulse train representing the two frequencies selected to perform the FSK by a decoder 52.

The decoder 52 detects a shift in frequency of the pulses being received from the product detector 50 and produces either a digital 0 or 1. The lower frequency is sometimes referred to as a SPACE condition, while the upper frequency is sometimes referred to as a MARK condition. In the preferred embodiment, the SPACE condition generates a DC voltage of 3.3 V and represents a logical 0. A MARK condition shall generate a DC voltage of 0 V and represents a logical 1.

A control sequencer 54 is a state engine which decodes and implements the communication protocol of the transponder 16. The control sequencer 54 frames the incoming digital data stream from the decoder 52 into a series of bytes, the meaning of which drives the next state sequence thereby determining the order of encoding in the output signal.

The control sequencer 54 also interfaces with an NVRAM 56. In this embodiment, the NVRAM 56 is non-volatile random-access memory. The NVRAM 56 is used to store and retrieve variable information. Based upon the contents of the decoding, the control sequencer 54 decides which actions to take and which pieces of the information from NVRAM 56 should be encoded ad returned to the interrogator.

When the transponder 16 switches to transmit mode, the control sequencer 54 generates the digital data stream required by an encoder 58.

The encoder 58 operates as described above for the decoder 52, except in reverse. An input condition of SPACE generates the lower frequency and MARK generates the shifted frequency.

The encoded information is passed to a balanced modulator 60. The balanced modulator 60 modulates the RF signal coming from the carrier PLL 48 with frequencies produced by the encoder 58. To accomplish this, the balanced modulator 60 of the preferred embodiment uses a diode or field-effect transistor (FET) array. The result of the modulation process is an RF output signal in which the carrier frequency and all upper side band frequencies have been canceled or suppressed.

The RF output signal is then passed to a power amplifier 62. The power amplifier 62 of the preferred embodiment is a class A type linear amplifier stage designed to raise the RF signal strength from the balanced modulator 60 to a level sufficient for transmission. In the preferred embodiment, the power amplifier 62 has a center frequency of 924 MHz and an 8 MHz passband.

The amplified output signal is then passed through the differentiator 36 and radiated out of the antenna 34 back to the interrogator.

Figure 4A:
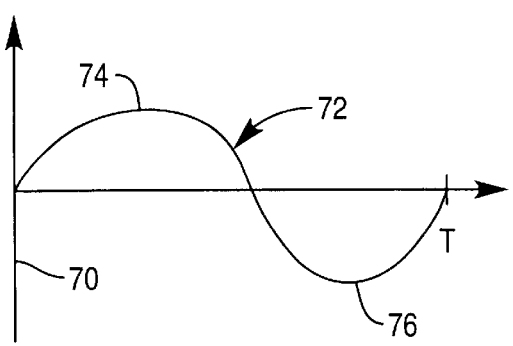
FIGS. 4A and 4B show graphs of a single cycle of a carrier wave and sidebands generated by the carrier wave, respectively.
Figure 4B:
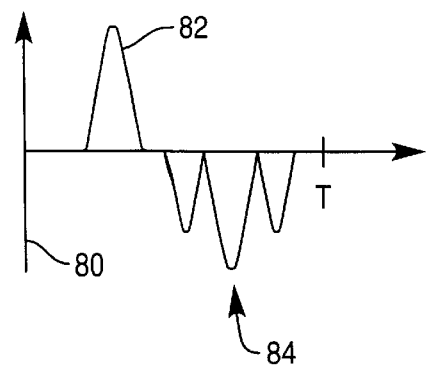

Referring now to FIGS. 4A and 4B, there is shown a graph 70 illustrating a single cycle of a carrier wave 72 plotted on a voltage versus time scale. The carrier wave 72 has an upper half cycle 74 and a lower half cycle 76 and extends for a period, T.

As previously described with respect to AM, modulation of the carrier wave 72 causes the generation of sidebands 82, 84. Graph 80 illustrates that an upper sideband 82 is generated when the upper half cycle 74 of the carrier wave 72 is modulated and a lower sideband 84 is generated when the lower half cycle 76 of the carrier wave 72 is modulated.

To attain single sideband transmission in FM, only the upper half cycle 74 is modulated, thus generating only the upper sideband 82. One skilled in the art will recognize that generation of the upper sideband may be accomplished in numerous ways, such as generating both sidebands and then suppressing the lower sideband, for example.

In the preferred embodiment, this is achieved by modulating the carrier only within a predetermined frequency range. For example, assume that the interrogator communication band is between 924.00 MHz to 924.02 MHz. FM operates by using an increasing frequency in the upper half cycle 74, reaching the median frequency at the zero crossing and decreasing the frequency in the lower half cycle 76. Thus, the upper half cycle 74 is modulated in this example between the frequency range of 924.01 MHz to 924.02 MHz. If modulation is clamped to only modulate the carrier signal 72 in this range then only the upper half cycle 74 is modulated and only the upper sideband 82 is generated.

In contrast to the conventional single sideband transmission, discussed above, the interrogator transmits the upper sideband 82 as well as the carrier signal 72. The interrogator encodes information onto the upper sideband 82 while the carrier signal 72 provides both power and a clock reference to the transponder. Note that the interrogator is a powered device and, therefore, has minimal restrictions on power output (limited primarily by federal regulations) while the transponder, in the preferred embodiment, is a passive device that must maximize the usage of its power.

Origination information, such as that previously described, is encoded onto the upper sideband 82. The data encoding technique is Frequency Shift Keying (FSK), although one skilled in the art will realize that Phase Shift Keying (PSK) or any of numerous other methods could also be employed.

In the preferred embodiment, the communication system is binary. A ZERO is defined as 23 kHz and a ONE is defined as 26 kHz. This spacing provides both good key discrimination and a reasonable data rate. The actual choice of keying frequencies is application specific and any of numerous others could be used, however, the choice of frequencies does impact the FM sideband effect.

Unlike amplitude modulation which produces two distinct sidebands on either side of the carrier, frequency modulation produces an infinite number of sidebands on either side of the carrier. The amount of carrier power transferred to any set of sidebands is determined by the modulation index (M). The frequency deviation of the FM carrier has no relationship to the modulation frequency since the frequency deviation of the carrier represents the waveform or amplitude of the modulation information.

The modulation index is the maximum deviation divided by the modulation frequency. In the preferred embodiment, the modulation index is 1.7 which transfers maximum power into the first sideband. This also ensures that the power distribution facilitates transmission by making the first sideband twice as strong as the second sideband. The third sideband is very weak and the rest are nominal and thus be ignored. One skilled in the art will realize that adjustments to the index can be made to accommodate other design factors and, therefore, the invention can use a wide range of indices.

At other modulation indices, the design constraints of this embodiment are no longer achieved. For example, at M=2.405 substantially all of the carrier power appears in the sidebands. However, the second and third sidebands are nearly as powerful as the first and results in undesirable operation. At M equal to or less than 0.6, the sideband energies are not strong enough to create the desired effect.

The distribution of power to the sidebands for any given modulation index is calculated using Bessel functions, which are well-known in the art.

The maximum bit rate for this example is. Therefore. 40 K bits per second. With FSK data encoding, reliable detection of the frequency shift between logical zero and logical one requires several cycles of stability in the current condition. If 3 cycles per mark is allowed, the maximum data bit rate becomes 40K/3 or 13.3K bits per second. Since 10 bits are used to represent a single character with a 2 bit time intercharacter gap, the byte rate becomes 13.3K/12 or 1.1K bytes per second.

With some allowance for protocol overhead, the estimated data rate using FSK encoding is therefore equivalent to 9600 Baud. This data rate is adequate for many data acquisition systems given that the amount of data being sent is quite small. However, in other applications, other data rates can be achieved for more advanced encoding modes. For example, using 180 degree PSK, 28K baud can be achieved; using 90 degree PSK (QPSK), 56K baud can be achieved; using 45 degree PSK, 112K baud can be achieved; and, using Quadrature Amplitude Modulation+45 degree PSK, 448K baud can be achieved, for example.

Figure 5:
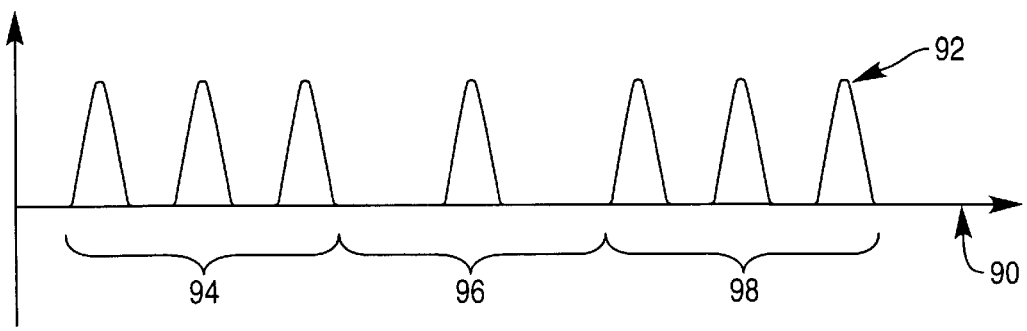
FIG. 5 shows a graph plotting a pulse train of upper sideband pulses.

Referring now to FIG. 5, there is shown a pulse train 92 of upper sideband pulses on a graph 90 plotting voltage versus time. This pulse train has been frequency shift keyed to encode a binary message. In this example, A first group 94 has been frequency shifted to the higher frequency which indicates a logical one. A second group 96 has been frequency shifted to the lower frequency which indicates a logical zero. A third group 98 has been frequency shifted to the higher frequency which again indicates a logical one. Thus the pulse train 92 is decodable to be '101'.

Simultaneously transmitted from the interrogator with the pulse train 92 is the carrier signal. The carrier signal carries power for charging the passive transponder and for providing a clock signal to the transponder circuit, both of which are described later herein. One skilled in the art will realize, however, that if the transponder has an independent power source or if the communication method is being used with another system not having such power constraints, then the carrier signal may be suppressed thereby increasing signal range or decreasing transmission power requirements of the transmitter.

Once the transponder receives the pulse train 92, the transponder encodes its own message and sends the new encoded message back to the interrogator. Previously described was a method of accomplishing this task using a single carrier and mirroring that carrier back after adding additional modulation. In this embodiment, the transponder transfers the origination information encoded on the upper sideband into the lower sideband and follows the origination information with its own code. In the preferred embodiment, a predetermined protocol is used such that corrupted packets of information are known and rejected. The protocol is further used to order the information within the packets in a known way to facilitate decompilation.

Figure 6:
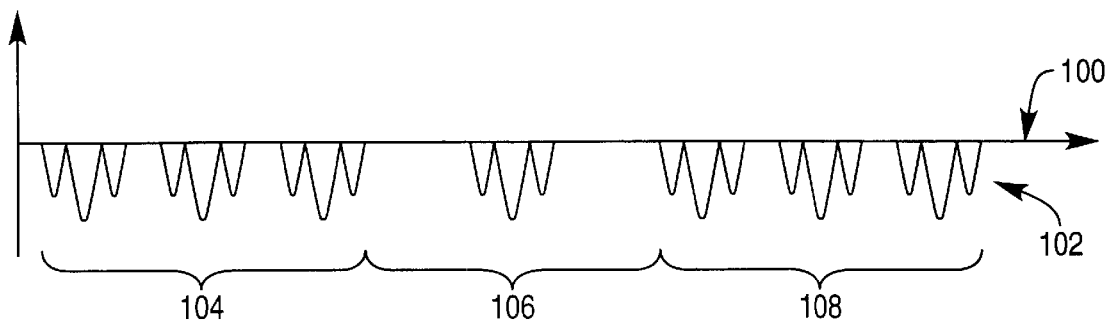
FIG. 6 shows a graph plotting a pulse train of lower sideband pulses.

FIG. 6 illustrates the encoding scheme of the transponder which mirrors that of the interrogator. A pulse train 102 of lower sideband pulses is shown on a graph 100 that plots voltage versus time. This pulse train 102 has been frequency shift keyed to encode a binary message. In this example, a first group 104 has been frequency shifted to the higher frequency which indicates a logical one. A second group 106 has been frequency shifted to the lower frequency which indicates a logical zero. A third group 108 has been frequency shifted to the higher frequency which again indicates a logical one. Thus the pulse train 102 is decodable to be '101'.

Since the encoding by the interrogator is on the upper sideband and the encoding by the transponder is on the lower sideband, bi-directional communication can occur substantially simultaneously in the same frequency spectrum without one transmission corrupting the other. Further, since the carrier no longer serves a purpose, the transponder suppresses the carrier and funnels the transmission power into the lower sideband thereby significantly increasing the range of the transmission.

A useful way of approximating the performance is to consider the theoretical isotropic point source antenna. All power radiated from such an antenna spreads out equally in all directions. Thus, a sphere of energy is radiated having a given surface area over which the energy is uniformly divided. The power available at any point in space is then inversely proportional to the area of the sphere. That is, $$P_{eff} = P_{rad}/D2$$

where $P_{eff}$=The effective power felt at the receiver;

$P_{rad}$=The effective radiated power from the transmitter;

D=Distance in meters.

The following is an example application of an application of the above equations to the previously described communication system. The assumptions used are purposely conservative and will vary in accordance with the application and its environment. The transponder is assumed, for example, to have high power requirements, though experiments have shown that this may not be the case.

In order to define a viable operating range, two main assumptions are being made: first, that the signal returned from the passive transponder returns a minimum of 0.1 μW back to the reader antenna; and second, that the transponder will return all RF energy it receives less a twenty percent loss for internal efficiencies.

Using the above-stated functions and given a 1 Watt transmission, the transponder receives 10 mW at 10 meters and 2.5 mW at 20 meters. This is sufficient to generate 5 μW back at the interrogator. The stated minimum of 0.1 μW is reached at 30 meters.

Repeating this procedure with a 10 Watt emission yields 4 mW to the transponder at 50 meters. The energy delivered back to the interrogator is then 1.3 μW, above the minimum.

In practical applications, an isotropic radiation pattern does not exist. Therefore, assuming more realistic propagation patterns actual performance would likely be much better. In addition, these estimates are for pure radiation. The effects of modulation and, particularly sideband transmission, are not factored in. However, sideband transmission is estimated to increase the effective radiated power at the transponder by sixty-six percent and at the interrogator by thirty-three percent.

Referring now to FIG. 7, a data packet structure is illustrated for use in implementing a communication protocol between the interrogator and the transponder. The following is a brief description of the fields and how they are used in the preferred embodiment. One skilled in the art will realize many alternative embodiments, but certainly a known protocol must be used for the state engine to understand what it is receiving and what it is expected to return.

The start character 300 signifies the beginning of a valid communications protocol packet. The start character 300 can be anything an implementor chooses. The preferred embodiment requires it be a hex "FE" character. When the interrogator begins transmitting, as previously described, the transponder is in a charging and synchronization phase. After a period of time, which is application dependent, the transponder is ready to receive a command packet. During this time the interrogator is transmitting a SPACE condition.

The command character 301 indicates what action is to be taken and also how various fields of the remaining packet are to be interpreted. A command character 301 has the following hex values and definitions in the preferred embodiment:

| Command | Code | Description |
| --- | --- | --- |
| BROADCAST | 4A | Find any and all transponders in the area. |
| LOCATE_ID | 4B | Find a specific transponder by identification |
| RESP_DATA | CA | Transponder read data response. |
| ACK_DATA | C1 | Acknowledge good received data packet. |
| RETRY | CF or 4F | Retry last transmission. |

All command characters 301 have bit 7 set to a 1 as an indication of a valid command character 301. There are in addition two types of characters: command type characters and response type characters. A command type character always has bit 6 set to a 0 while a response type character always has bit 6 set to a 1.

The length characters 302 define the number of characters remaining to be sent in this packet not including the length characters 302. The length characters 302 are transmitted as hex bytes MSB first, LSB last. The maximum length of the packet can be as little as 1 or as many as 65536 characters. In the preferred embodiment, the length characters 302 are two bytes.

The Must-Be-Zero character ("MBZ") 303 is used to indicate the end of the command header. A value other than zero in the MBZ 303 indicates a problem with the packet.

The source ID character 304 is the serial number of the interrogator as assigned on the date of manufacture. The combination of the source ID 304 and the sequence number 305 are used to uniquely identify a packet. In the preferred embodiment, each packet must transmit an acknowledged signal and thus this identification assists in the handling of collisions and other communications errors. In the preferred embodiment, the Source ID 304 is ten bytes.

The sequence number 305 is used to uniquely identify the current communication transaction. At first power on of the interrogator, the sequence number 305 is set to zero. Afterwards, when each successful transaction is completed the number is incremented by one. Overflow resets the number to zero. In the preferred embodiment, the sequence number 305 is ten bytes.

The sequence number 305 is used by the transponder state engine to keep track of command completion. When there are several transponders within range of an interrogator, all may be required (command dependant) to respond to the interrogator. A collision (two or more transponders transmitting at once) is a likely event. Each transponder stores the current sequence number 305 in the NVRAM along with a flag indicating completion. In this way the transponder will know to take no action if a duplicate command packet is received to which it has already responded. Interrogators will repeat the same sequence number in subsequent packets until all transponders have acknowledged the packet.

The destination ID field 306 is command specific and is used to address a specific transponder for specific operations. The destination ID is usually the serial number of the transponder as assigned on the date of manufacture. The destination ID field 306 is optional and in the preferred embodiment is fifteen bytes.

The data field 307 is command specific and may be used to pass parameters relative to the current command or in response packets is used by the transponder to return data requested by the interrogator. In the preferred embodiment data field 307 can range from zero to sixty-four kilobytes.

The CRC character 308 is the exclusive-or, or XOR, of each byte in the packet. The transponder calculates this value and compares it with the value of the CRC character 308 sent by the interrogator. If these values do not match, the packet is rejected and must be retried.

The above-described communication method is both useful in this radio-frequency identification system as well as various other applications. Any application having passive devices in the communication path can benefit but also those without such passive devices. By simply suppressing the carrier from the interrogator, bi-directional communication is achieved that is very resistant to noise, has relatively low power constraints, or, alternatively has a significant communication range. Examples of such applications are wireless networks such as LANs; walkie-talkies, though voice signals would generally have to be digitized prior to transmission; three-dimensional modeling and diagnostics for uses in areas such as robotics; inter alia.

Figure 8:
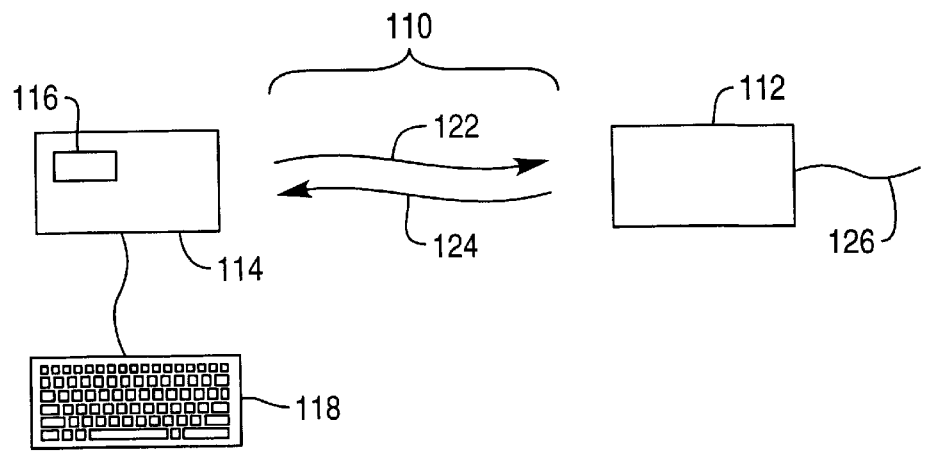
FIG. 8 shows a block diagram of an active communication system in accordance with the invention.

FIG. 8 shows an alternative embodiment of the invention where the communication system is used with two active devices. Example of where this communication system is useful are low-power, high-bandwidth communication systems such as short-range video transmission; high data rate low error to noise ratio communications such as wireless LANs; and low-power high range systems such as microcellular. One skilled in the art will realize that the communication system is adaptable to numerous applications and, thus, is not limited to that described herein.

In this communication system 110, a wireless LAN is shown where full-duplex communication is used and the carrier is suppressed to attain greater range at low power. In most cases, a hard-wired local area network ("LAN") 126 is already installed in a business environment. In that case, an interrogator 112 disposed in electrical communication with the LAN 126 and periodically transmits an interrogator signal 124. The interrogator signal 124 communicates with a remote computer 114 having a transponder 116 disposed therein. In the preferred embodiment, the transponder 114 is disposed on an Ethernet card disposed in the remote computer 114.

The remote computer 114 then encodes information in an encoded signal 122 which is transmitted back to the interrogator. The encoded information can be commands entered from a peripheral 118, such as a keyboard, or any of various other devices.

In the active system, the transponder and the interrogator are interchangeable in that at any given time either can initiate communication with the other.

In the case of video communication, the video signal may be transmitted from the remote computer to a transponder. An example of a use for such a transmission would be to view the video on a television. In that case, the transponder would be electrically connected to a television and the video signal from the computer would be displayed thereon. A keyboard or mouse would then communicate with the transponder and the encoded signal would include information from those devices to control the remote computer.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. A communication system comprising:
   a transmitter adapted to transmit a first frequency-modulated data encoded on a first sideband of a predetermined frequency;
   a transponder adapted to receive the encoded data on the first sideband and to transmit a second frequency-modulated data encoded on a second sideband of the predetermined frequency, wherein the second sideband is distinct from the first sideband; and
   a receiver adapted to receive the second frequency-modulated data encoded on the second sideband transmitted from the transponder, and to decode the second frequency-modulated data therefrom.

2. The communication system according to claim 1 further comprising an interrogator in which the transmitter and the receiver are disposed.

3. The communication system according to claim 1 wherein the first frequency-modulated data is disposed within the second frequency-modulated data.

4. The communication system according to claim 1 wherein the transponder is passive.

5. The communication system according to claim 4 wherein the transmitter transmits a carrier signal from which and the transponder is adapted to draw energy from the carrier signal.

6. The communication system according to claim 4 wherein the transponder is adapted to draw energy from ambient radiation.

7. The communication system according to claim 1 wherein the first sideband is the upper sideband.

8. The communication system according to claim 1 wherein the second sideband is the lower sideband.

9. The communication system according to claim 1 wherein the communication system provides full-duplex communication.

10. The communication system according to claim 1 further comprising suppression means to suppress a carrier signal thereby augmenting transmission range.

11. The communication system according to claim 1 wherein the first frequency-modulated data is video.

12. The communication system according to claim 1 wherein the transponder further comprises an antenna and the antenna is coated with a radiation absorbing coating.

13. The communication system according to claim 1 wherein the transmitter transmits data using frequency modulation.

14. An interrogator comprising:
    a transmitter adapted to transmit a signal on a predetermined frequency to a remote communication device which draws power from the signal;
    a receiver adapted to receive a signal on a first frequency-modulated sideband of the predetermined frequency from the remote communication device; and
    a decoder in electrical communication with the receiver for decoding information from the received signal,
    wherein the transmitted signal is transmitted on a second frequency-modulated sideband of the predetermined frequency having a nondestructive relationship with the first frequency-modulated sideband and having frequency-modulated data encoded thereon.

15. A communication system comprising:
    a first communication device having a first transmitter and a first receiver disposed therein, the first transmitter being adapted to transmit a first signal having first frequency-modulated data encoded on a first sideband, the first receiver being adapted to receive signal transmitted on a second sideband of the predetermined frequency and to decode second frequency-modulated data therefrom; and
    a second communication device having a second receiver and a second transmitter disposed therein, the second receiver being adapted to receive signal transmitted on the first sideband of the predetermined frequency, the second transmitter being adapted to transmit on the second sideband a second signal having second frequency-modulated data encoded.

16. The communication system according to claim 15 wherein the first sideband and the second sideband have a nondestructive relationship.

17. The communication system according to claim 15 wherein the second frequency-modulated data comprises the first frequency-modulated data.

18. A method of radio frequency communication comprising the steps of:
    transmitting a first signal having a carrier and a first sideband which is frequency modulated with origination information that identifies the source of the transmission;
    drawing energy from the carrier sufficient to power a passive device;
    encoding data onto a second sideband where the data comprises the origination information;
    transmitting the encoded data on the second sideband;
    receiving the encoded data on the second sideband; and
    decoding the received encoded data.

* * * * *